United States Patent
Hoyle et al.

(10) Patent No.: US 7,336,562 B1
(45) Date of Patent: Feb. 26, 2008

(54) SONIC LOGGING TOOL INCLUDING RECEIVER AND SPACER STRUCTURE

(75) Inventors: David Hoyle, St Nazaire les Eymes (FR); Hitoshi Tashiro, Kamakura (JP); Akira Otsuka, Machida (JP); Jahir Pabon, Brookfield, CT (US); Hitoshi Sugiyama, Sagamihara (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/416,264

(22) PCT Filed: Nov. 16, 2000

(86) PCT No.: PCT/IB00/01696

§ 371 (c)(1),
(2), (4) Date: Sep. 8, 2003

(87) PCT Pub. No.: WO02/41034

PCT Pub. Date: May 23, 2002

(51) Int. Cl.
*G01V 1/52* (2006.01)

(52) U.S. Cl. .................. 367/25; 367/911; 181/102; 181/104; 181/106

(58) Field of Classification Search .............. 367/25, 367/57, 178, 911; 181/104, 106, 111, 121, 181/102
See application file for complete search history.

(56) References Cited

U.S. PATENT DOCUMENTS

| | | | |
|---|---|---|---|
| 3,191,142 A | 6/1965 | Lebourg | |
| 3,493,921 A * | 2/1970 | Earl | 367/86 |
| 3,504,757 A * | 4/1970 | Chapman | 181/104 |
| 4,850,450 A | 7/1989 | Hoyle et al. | |
| 4,872,526 A | 10/1989 | Wignall et al. | |
| 5,036,945 A | 8/1991 | Hoyle et al. | |
| 5,043,952 A * | 8/1991 | Hoyle et al. | 367/159 |
| 5,229,553 A | 7/1993 | Lester et al. | |
| 5,343,001 A | 8/1994 | Cowles et al. | |
| 5,510,582 A * | 4/1996 | Birchak et al. | 181/102 |

(Continued)

FOREIGN PATENT DOCUMENTS

EP    0388316    9/1990

(Continued)

OTHER PUBLICATIONS

B.K. Sinha, S. Zeroug, "Geophysical Prospecting Using Sonics and Ultrasonics", Wiley Encyclopedia of Electrical and Electronic Engineering 1999, pp. 340-365.

(Continued)

*Primary Examiner*—Jack Keith
*Assistant Examiner*—Scott A Hughes
(74) *Attorney, Agent, or Firm*—Karan Singh; Jaime Castano; Dale Gaudier

(57) ABSTRACT

A formation logging tool having a substantially continuous central mandrel with regularly spaced mass blocks disposed thereon, at least some of the mass blocks carrying sensors such as receivers. By adopting this structure, the tool can be made to behave as a mass-spring structure and its flexural and extensional behaviour controlled such that its dispersion curve does not extend into the dispersion curve of the formation to be logged. The structure can be applied to the whole of the logging tool or just to the receiver section and/or any spacer section between the receiver and the transmitter section.

33 Claims, 10 Drawing Sheets

U.S. PATENT DOCUMENTS

| | | | |
|---|---|---|---|
| 5,728,978 A | 3/1998 | Roberts et al. | |
| 5,731,550 A | 3/1998 | Lester et al. | |
| 5,936,913 A | 8/1999 | Gill et al. | |
| 6,474,439 B1 | 11/2002 | Hoyle et al. | |
| 6,494,288 B1 * | 12/2002 | Tashiro et al. | 181/102 |
| 6,564,899 B1 * | 5/2003 | Arian et al. | 181/102 |

FOREIGN PATENT DOCUMENTS

| | | |
|---|---|---|
| FR | 1110921 | 2/1956 |
| WO | WO 99/56155 | 11/1999 |
| WO | WO 00/17673 | 3/2000 |

OTHER PUBLICATIONS

L.N. Tello, T.J. Blankinship, E.K. Roberts, R.D. Kuzmiski, "A Dipole Array Sonic Tool for Vertical and Deviated Wells", SPE 56790, 1999 SPE Annual Technical Conference and Exhibition, Houston, Texas Oct. 3-6, 1999.

* cited by examiner

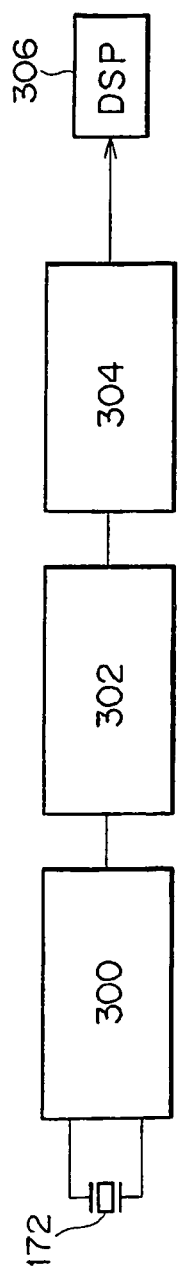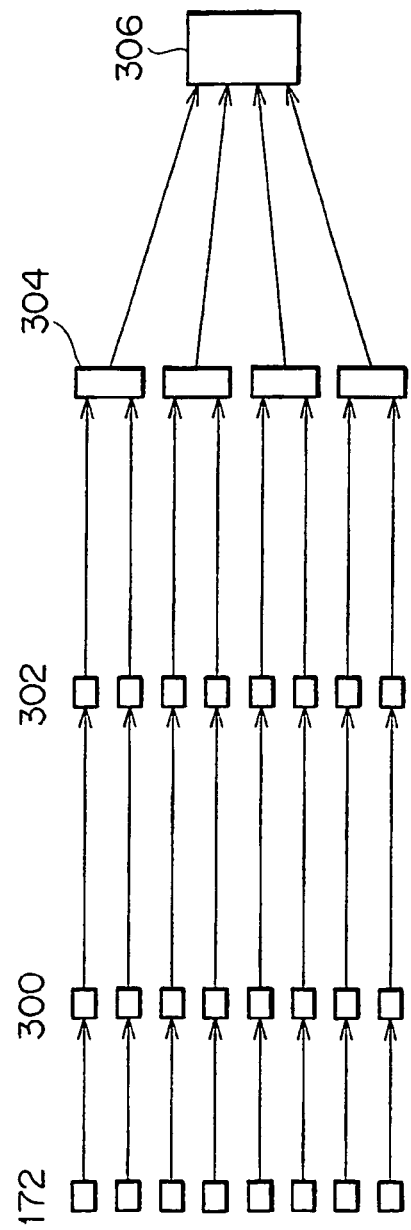

SONIC LOGGING TOOL INCLUDING RECEIVER AND SPACER STRUCTURE

FIELD OF THE INVENTION

The present invention relates to structures for use in receiver arrays and spacers for use in sonic borehole logging tools. In particular, the invention relates to a structure having a particular flexural behavior which is designed to reduce the impact of interference with sonic logging measurements.

BACKGROUND OF THE INVENTION

The field of sonic logging of boreholes in the oil and gas industry involves making acoustic measurements in the borehole at frequencies typically in the range 500 Hz-20 kHz. Below this range is typically considered as the seismic domain, above it the ultrasonic domain. A summary of the general techniques involved in borehole acoustic logging can be found in GEOPHYSICAL PROSPECTING USING SONICS AND ULTRASONICS, Wiley Encyclopedia of Electrical and Electronic Engineering 1999, pp 340-365.

One example of a sonic logging tool used by Schlumberger is the Dipole Sonic Imaging tool (DSI), shown in schematic form in FIG. 1. The DSI tool comprises a transmitter section 10 having a pair of (upper and lower) dipole sources 12 arranged orthogonally in the radial plane and a monopole source 14. A sonic isolation joint 16 connects the transmitter section 10 to a receiver section 15 which contains an array of eight spaced receiver stations, each containing two hydrophone pairs, one oriented in line with one of the dipole sources, the other with the orthogonal source. An electronics cartridge 20 is connected at the top of the receiver section 15 and allows communication between the tool and a control unit 22 located at the surface via an electric cable 24. With such a tool it is possible to make both monopole and dipole measurements. The DSI tool has several data acquisition operating modes, any of which may be combined to acquire waveforms. The modes are: upper and lower dipole modes (UDP, LDP)—waveforms recorded from receiver pairs aligned with the respective dipole source used to generate the signal; crossed dipole mode—waveforms recorded from each receiver pair for firings of the in-line and crossed dipole source; Stoneley mode—monopole waveforms from low frequency firing of the monopole source; P and S mode (P&S)—monopole waveforms from high frequency firing of the monpole transmitter; and first motion mode—monopole threshold crossing data from high frequency firing of the monopole source. One frequently observed problem in dipole logging is the propagation of a flexural signal from the source to the receivers along the tool itself. This signal, often known as a "tool arrival", interferes with the detection of the corresponding signal that has propagated in the formation and so is highly undesirable. Approaches that have been taken to remove or reduce the occurrence of tool arrivals include the provision of a device or structure between the source and receivers which prevents propagation of the tool arrival (an "isolator"), and adoption of a receiver structure which delays or attenuates the tool arrival.

One form of isolator is found in tools in which the sources and receiver are found in two separate bodies connected by a relatively flexible connector such as a cable or flexible tube. An example of this is found in U.S. Pat. No. 5,343,001. Such an approach is effective in preventing the tool arrival from passing directly along the tool body from the source to the receiver but has the problem in that the tool cannot be used in any borehole which is not vertical, or nearly so. Since boreholes that are deviated from vertical are very common, such a tool has limited application. This structure also does not address the problem of a flexural signal coupling into the receiver structure from the borehole and then propagating along the receiver.

For tools in which the sources and receiver are connected in a relatively rigid structure (i.e. one which can operate in deviated boreholes), the approach has been to interpose an isolator between the source and receiver which interrupts the tool arrival path with a structure which delays and/or attenuates the flexural signal propagating along the tool body. In the DSI tool described above, the sonic isolation joint includes stacks of rubber and steel washers located around connecting members. This structure is the only connection between the transmitter and receiver, there being no continuous housing or tool body between the two. The sonic isolation joint is disclosed in more detail in U.S. Pat. No. 4,872,526.

Another form of isolator is a segmented structure in which the isolator is made up from a series of segments, each of which is connect only to its neighbors, there being some resilient or absorbent material at each joint. Examples of such structures are found in U.S. Pat. No. 5,229,553 which has a series of shells and spools, or in U.S. Pat. No. 5,728,978 which has a number of tubular members joined by interlocking lobes (see also SPE 56790 A Dipole Array Sonic Tool for Vertical and Deviated Wells, Lucio N. Tello, Thomas J. Blankinship, Edwin K. Roberts, Computalog Research. Rick D. Kuzmiski, Computalog Ltd., 1999 SPE Annual Technical Conference and Exhibition, Houston, Tex. 3-6 Oct. 1999).

As well as providing an isolator between the source and receiver, modifications to the structure of the receiver section itself have been proposed. In the DSI tool, for which the receiver housing provides the main structural strength for the tool, a combination of slots and apertures and mass loading rings are used to modify the acoustic behavior of the housing to reduce or delay to flexural (and other) tool arrivals. Further examples of this approach can be found in U.S. Pat. No. 4,850,450 and U.S. Pat. No. 5,036,945. In U.S. Pat. No. 5,731,550 the segmented structure applied to the isolator in U.S. Pat. No. 5,229,553 is also applied to the receiver section. However, since this is not a rigid structure, it may be necessary to also provide a housing or sleeve to make the tool able to operate in deviated boreholes. Other approaches to addressing this problem are discussed in PCT Application No. PCT/EB98/00646, published as WO99/56155, and incorporated herein by reference.

To date, no approach has been completely successful in removing or preventing flexural tool arrivals. It is an object of the present invention to provide a tool structure in which the problem of flexural tool arrival can be handled in a way which does not compromise the ability of the tool to make dipole measurements of the formation.

SUMMARY OF THE INVENTION

The present invention provides a structure for a logging tool which comprises a substantially continuous central mandrel having regularly spaced mass blocks disposed thereon, at least some of the mass blocks carrying sensors such as receivers.

By adopting this structure, the tool can be made to behave as a mass-spring structure and its flexural and extensional behaviour controlled such that its dispersion curve does not extend into the dispersion curve of the formation to be logged. The structure can be applied to the whole of the logging tool or just to the receiver section and/or any spacer section between the receiver and the transmitter section.

A tool incorporating the invention will include at least one acoustic signal source and a receiver section and/or a spacer section having the mandrel-mass block structure. Preferably the tool comprises a transmitter section with monopole and orthogonal dipole sources, a spacer with the mandrel as the load bearing member, and a receiver section with further monopole sources and a receiver array formed from the mandrel-mass block structure.

Where the mass block structure is applied to the receiver section of a logging tool, some of the blocks are used to carry acoustic receiver elements such as hydrophones. The blocks act as receiver mountings and are connected to each other only via the mandrel. By locating receiver elements on a number of adjacent blocks, a receiver array can be formed. The array will typically comprise a number of receiver stations (mass blocks), for example eight, twelve or sixteen stations, each of which has several receiver elements arranged in a regular manner around the periphery of each station, for example four or eight receiver elements.

Front end electronics can be associated with each receiver element so as to provide a digital output from each one. The required circuitry can be located around the mandrel adjacent to the respective receiver mountings. In this manner, communication of signals along the tool in the digital domain can be achieved.

The receiver elements are preferably provided with appropriate electronics so that the output is in digital form.

Further monopole sources can be located at either end of the receiver array.

Where the mandrel-mass block structure is applied to a spacer section, it is preferably disposed between the transmitter and receiver sections of the tool. The mandrel acts as a continuous load-bearing structure and can be hollow to define a wiring conduit between the two parts of the tool. A non-load bearing outer sleeve made from a material such as teflon can be provided (a similar sleeve can also be provided for a receiver structure).

The invention is described below in relation to the drawings by way of example. It will be appreciated that variations can be made in implementation while remaining within the scope of the invention.

BRIEF DESCRIPTION OF THE DRAWINGS

FIG. 10 shows acquisition electronics at the sensing element level;

FIG. 11 shows acquisition electronics at the receiver station level;

DESCRIPTION OF THE PREFERRED EMBODIMENT

Figure 1:
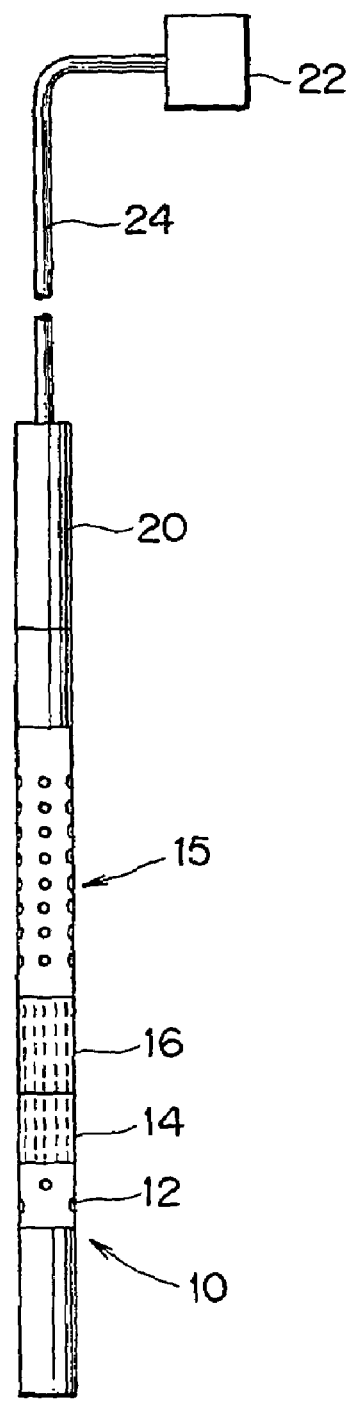
FIG. 1 shows a prior art sonic logging tool.
Figure 2:
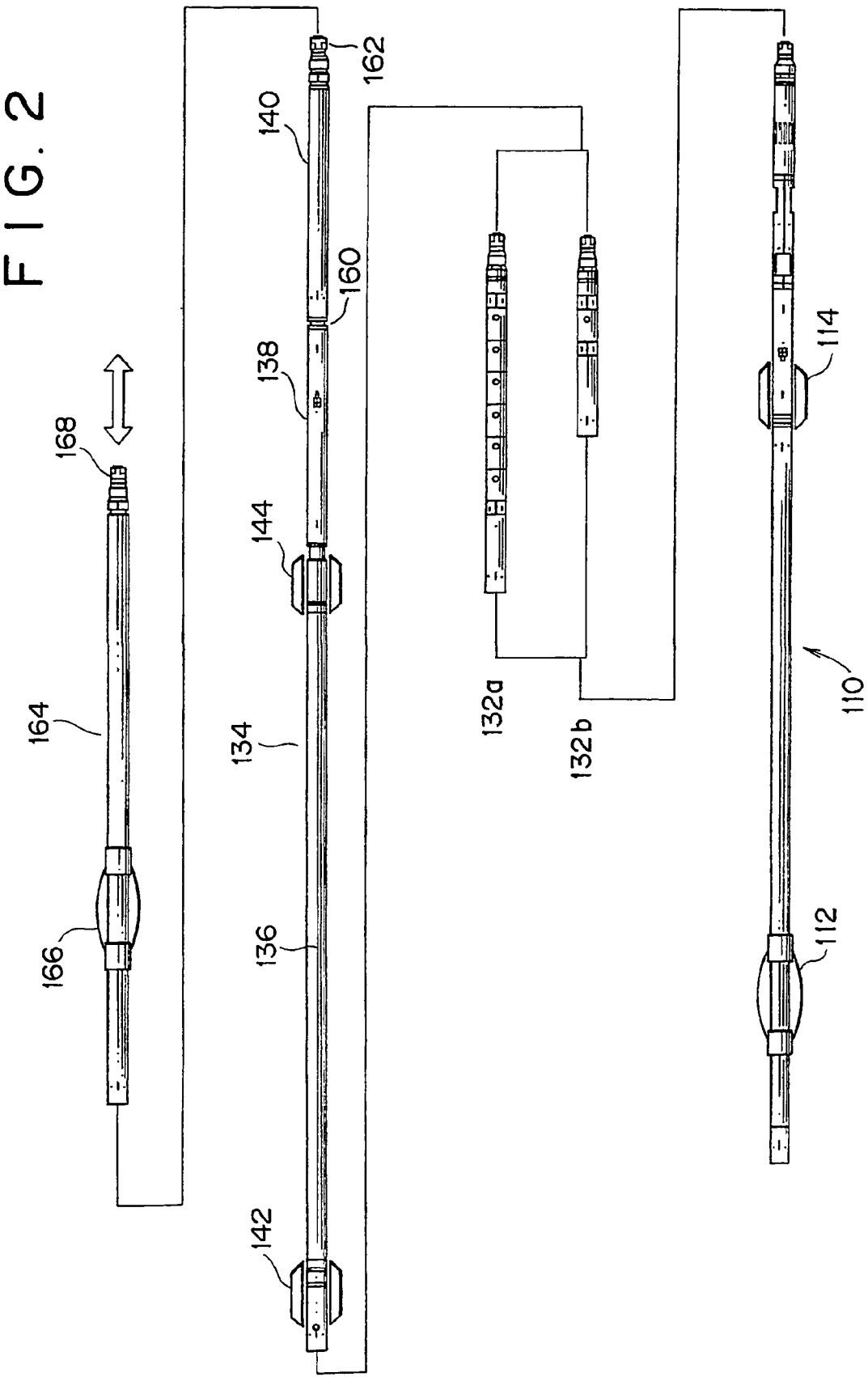
FIG. 2 shows a logging tool incorporating embodiments of the present invention.
Figure 3:
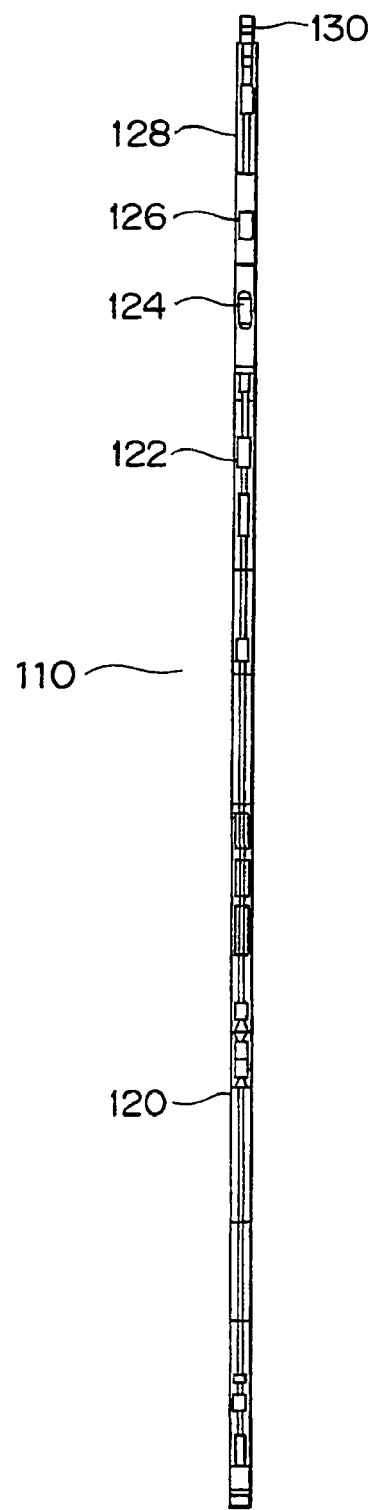
FIG. 3 shows a more detailed view of a transmitter module of the tool of FIG. 2.

Referring now to FIG. 2, there is shown therein a borehole logging tool including a receiver section and a spacer section according to embodiments of the invention. The tool shown in FIG. 2 comprises an acoustic transmitter module 110 including a centraliser 112 and a standoff 114. The transmitter module 110 is shown in more detail in FIG. 3 and comprises an electronics section 120 with appropriate electronics and drive circuitry for the acoustic sources, an oil volume compensator section 122, a first dipole source 124 (nominal "Y" direction), a second dipole source 126 (orthogonal to the first source 124, nominal "X" direction) and a monopole source 128. The dipole sources 124, 126 are substantially as described in the applicants' copending U.S. patent application Ser. No. 09/537,836 entitled "Dipole Logging Tool", filed Mar. 2, 2000 (incorporated herein by reference) and the monopole source 128 is substantially as described in U.S. Pat. No. 5,036,945 (incorporated herein by reference). A feed-through section 130 is provided to allow power and signalling wiring to be connected to the portion of the tool above the transmitter module 110.

Figure 4A:
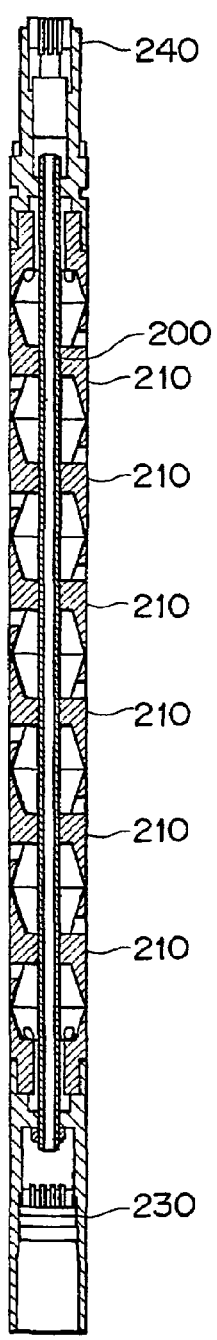
FIGS. 4a, 4b and 4c show more detailed views of a spacer section of the tool of FIG. 2 and the mass block used therein.
Figure 4B:
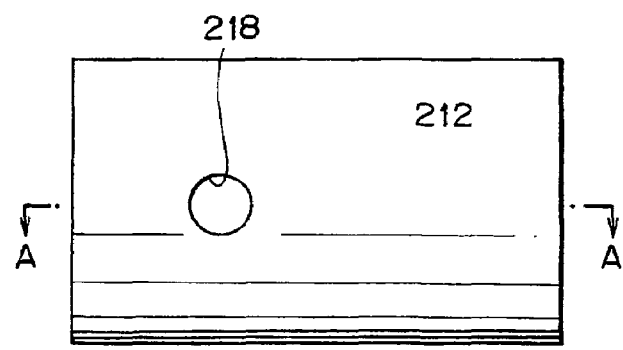
Figure 4C:
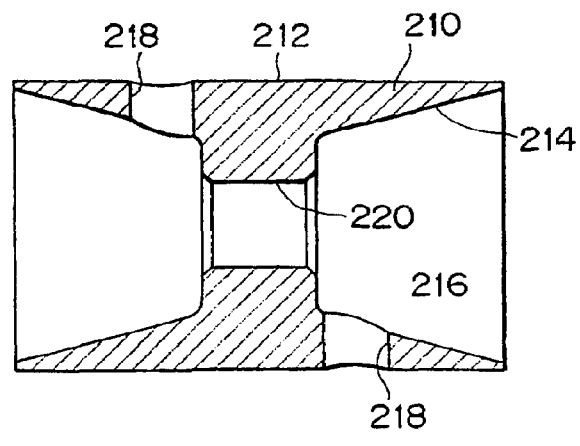

As shown in FIG. 2, connected immediately above the transmitter module 110 is a spacer section 132. Two options are shown in the figure, a long section 132a and a short section 132b. The length of the spacer section can be selected according to the expected acoustic behaviour of the formation to be logged. The spacer section 132 is described in more detail in relation to FIGS. 4a, 4b and 4c, and comprises an inner mandrel 200 formed from a titanium alloy pipe having a series of stainless steel mass structures 210 comprising blocks with a cylindrical outer surface 212 and a shaped inner surface 214 defining a cavity 216 mounted securely at regular intervals along the length of the mandrel 200. The masses 210 are secured to the mandrel 200 by heating each mass 210 to cause it to expand and sliding it into place over the mandrel 200 using a bore 220 defined by the inner surface 214 of each mass 210. The mass 210 is then allowed to cool and shrink around the mandrel 200. By careful selection of the material and structure of the mandrel 200 and masses 210, and appropriate positioning of the masses 210 along the mandrel 200, the spacer can be configured to behave acoustically like a mass-spring structure which does not interfere with the acoustic signals used for evaluation of the formation surrounding the borehole, while still providing suitable physical structure and support for the other parts of the tool. Since there is no sleeve or housing around the spacer, and the mass blocks 210 are hollow and not sealed to each other, it is possible for borehole fluids to enter the cavity 216 in the mass blocks 210 and mud to build up inside the blocks and affect their acoustic behaviour. In order to allow cleaning of the cavity 216, bores 218 are provided through the sidewall 212 of the blocks 210. The mandrel 200 is hollow and connected to feed throughs 230, 240 at either end of the spacer section 132 such that wiring (not shown) can pass through the spacer 132 between the transmitter module 110 and the receiver sonde 134.

Figure 5:
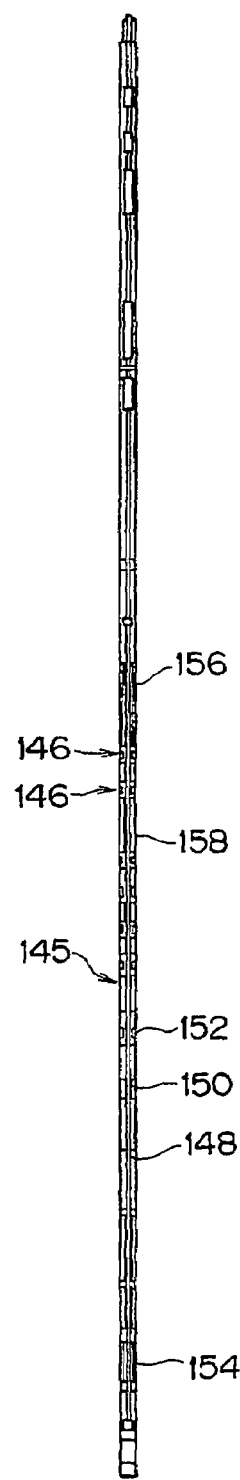
FIG. 5 shows a general view of the interior of the receiver sonde of the tool of FIG. 2.

The top of the spacer section 132 is connected to a receiver sonde 134 comprising a receiver and near monopole transmitter section 136, an oil volume compensator 138 and a sonde electronics section 140, and which is provided with rubber standoffs 142, 144. A general view of the internal structure of the receiver sonde 134 is shown in FIG. 5. The receiver and near monopole transmitter section 136 of the sonde 134 comprises an array 145 of receiver stations 146 (16 in this example although other numbers are possible) spaced along a central mandrel 148, each station 146 comprising a receiver mounting block 150 connected to the mandrel 148 and having a number of sensing elements 152 (hydrophones) arranged equiangularly around the circumference of the block 150. In the present case, eight elements 152 are provided but other numbers, e.g. four, can also be used. Front end electronics boards are associated with each receiver station 146 and are described in more detail below. Monopole transmitters 154, 156 are mounted at either end of the receiver array 145. The receiver and near monopole section 136 is encased in an armoured teflon sleeve 158 and is filled with oil for pressure compensation. The oil volume compensator 138 is connected above the receiver and near monopole transmitter section 136 and connected to the interior thereof. The sonde electronics section 140 is connected above the oil volume compensator 138 and includes front end power supplies and step up transformers (not shown) for the monpole sources. Feed throughs 160 are provided to allow wiring communication between the various sections of the sonde 134. The upper part of the sonde 134 is also provided with feed throughs 162 for connection to a master electronics cartridge 164 which also has a centraliser 166. The cartridge 164 is provided with standard connectors 168 which allow connection to other tools in a logging tool string or to a telemetry cartridge which communicates with a surface system via a wireline logging cable (not shown).

Figure 6:
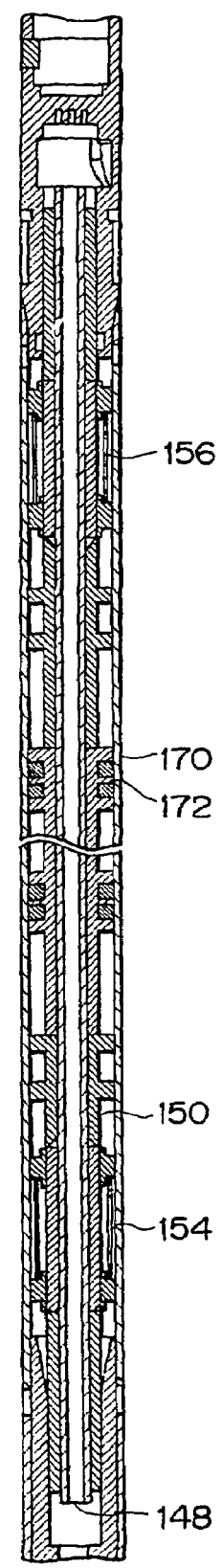
FIG. 6 shows a partial view of the physical elements of the receiver and near transmitter section of the receiver sonde.
Figure 7A:
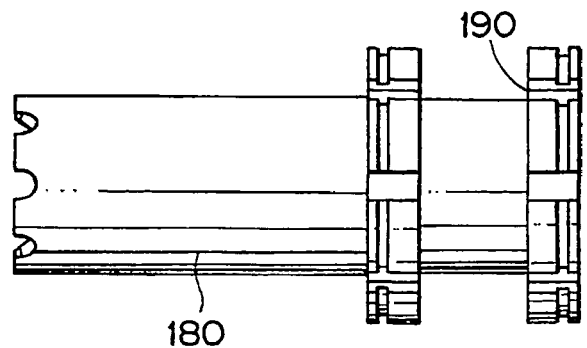
FIGS. 7a, 7b and 7c show side, cross-section, and isometric views of a mass block used in the receiver sonde.
Figure 7B:
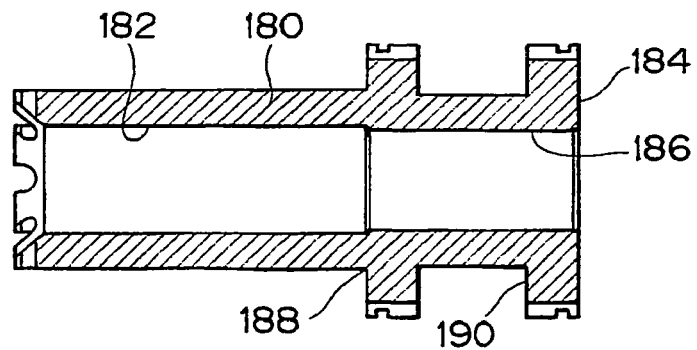
Figure 7C:
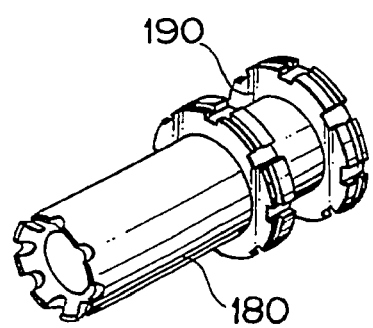
Figure 8:
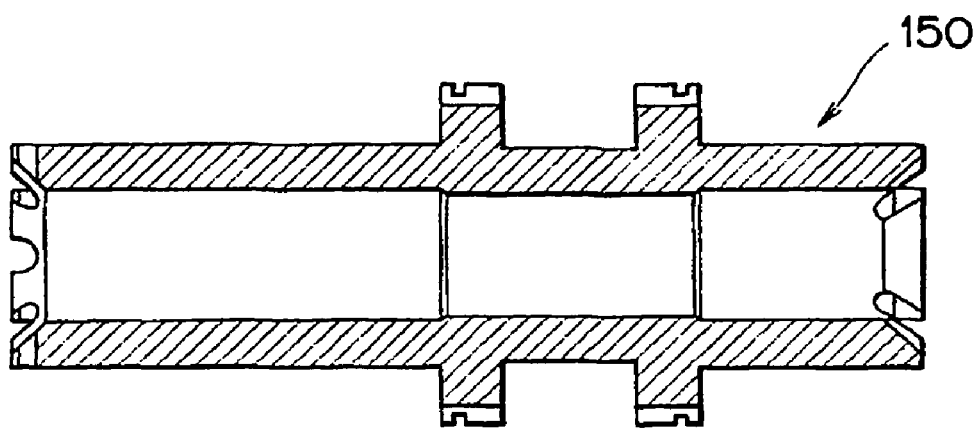
FIG. 8 shows an alternative block design.

The receiver sonde is shown in more detail in FIGS. 6, 7 and 8. The basic structure of the receiver section 136 is a mandrel 148 and mass block 150 arrangement similar to that used in the spacer section. Monopole sources 154, 156, essentially the same as that described in relation to the transmitter section above, are provided at either end of the receiver section 136. The mandrel 148 extends between these sources 154, 156 and the series of mass blocks 150 are mounted on the mandrel 148 in the same way as in the spacer section. Sixteen adjacent blocks 150 define receiver mountings 170 each of which carries a circumferential array of receiver elements (hydrophones) 172 spaced around the periphery thereof. One diametrically opposed pair of elements in each station are aligned with a respective one of the dipole sources. In this embodiment, eight receiver elements 172 are provided. It will be appreciated that the number of stations and the number of receiver elements at each station can be selected according to requirements, for example, twelve stations, each with four receiver elements could be chosen.

The blocks 150 comprise a relatively elongated, tubular body 180 having a bore 182 extending through the middle. An end section 184 of the bore 182 has a region 186 of reduced diameter which embraces the outer surface of the mandrel 148. The outer part 188 of the block 150 is formed into a mounting cavity 190 for the sensing element 172. An alternative form of block 150 is shown in FIG. 8. These forms, or other similar structures can be used to define the acoustic behaviour of the receiver section, particularly in the flexural mode. Each block 150 is connected so that it does not contact the adjacent blocks directly. The only continuous structure in the receiver is the mandrel 148. Dummy blocks (such as shown in FIG. 8) can be provided at the ends of the receiver station array 145 to ensure consistent acoustic behaviour of the structure near the ends of the array.

The sensing element 172 is preferably a piezoelectric pressure sensor. The preferred form of sensor comprises a piezoelectric cylinder with end caps connected by a screw extending through the cylinder. Another form of sensor is a polarised stack of piezoelectric plates. These can be in the form of a stack with a screw extending through the centre of the stack to compress the plates. Alternatively, the plates can be located in a housing and separated from each other by electrodes to maximise the pressure effect on the plates. Whichever form of sensor is used, it is preferred that the axis of polarisation is parallel to the longitudinal axis of the tool. The exact manner in which the sensing element 172 is mounted in the block 150 will depend upon the form of the sensing element used.

Figure 9:
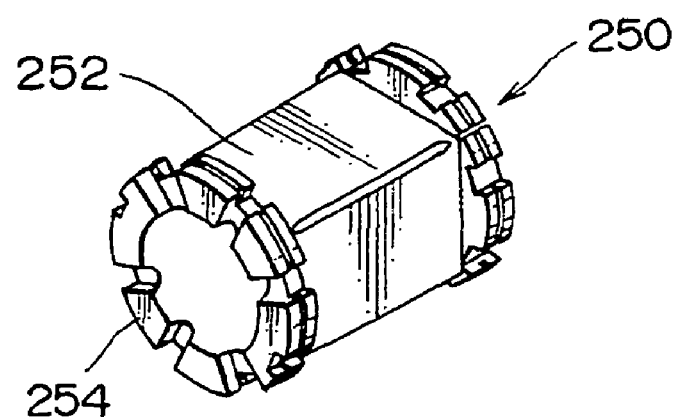
FIG. 9 shows a PCB mounting.

Front end electronics are mounted on circuit boards (not shown) located on mountings 250 (see FIG. 9) positioned around the outer part of each block 150, one set of boards on a mounting 250 being associated with each receiver station. The mountings 250 comprise four surfaces 252 located between circular end fittings 254 which fit over the block 150. The outer diameter of the end fittings is substantially the same as that of the mounting cavity 190.

Figure 12:
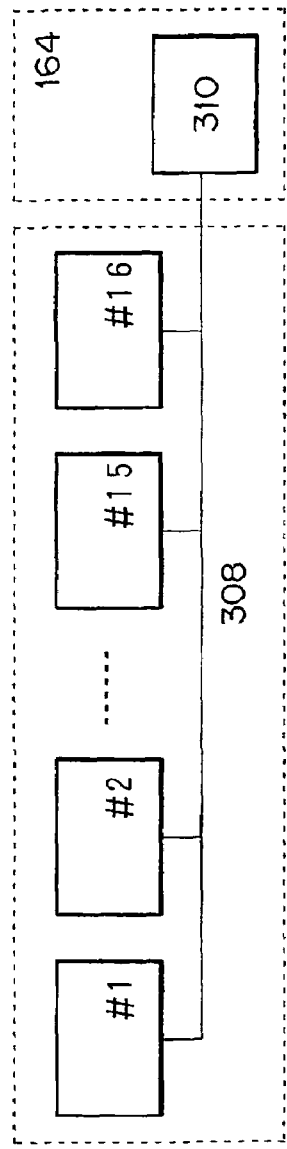
FIG. 12 shows the architecture of the receiver communication bus.

The basic electronic structure for the receiver front end is shown in FIG. 10 and comprises the sensing element 172, whose output is fed to a first stage 300 including a charge to voltage conversion amplifier with a first order high pass filter. The output from the first stage 300 passes to a second stage 302 which has a programmable gain amplifier and a ADC input buffer. The output from the second stage 302 passes to an ADC 304 with a 20 bit delta-sigma converter and decimation filter which provides serial data to a DSP 306. When extended to an eight sensor station as described here, the front end electronics can be implemented as shown in FIG. 11, with separate first and second stages for each sensor and a two channel ADC 304 being provided to handle the outputs from two sensors at a time. It will be appreciated that the number of channels for the ADC will depend on the particular implementation of an ADC used. The resulting output from the DSP provides a digital output for each receiver station #1 through #16 which is passes along a common serial bus 308 in the receiver section to a master DSP 310 in the master electronics cartridge 164 (FIG. 12).

Figure 13:
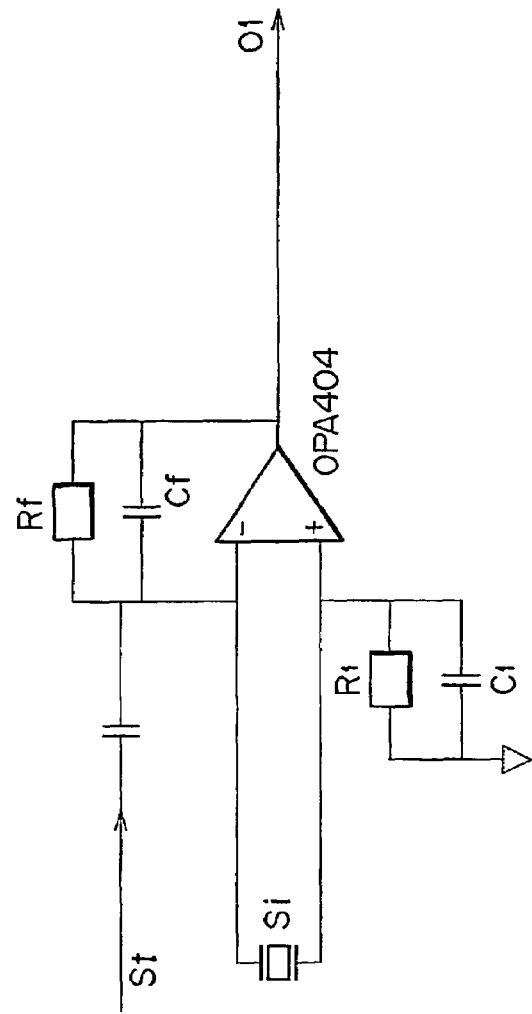
FIG. 13 shows a first stage amplifier circuit design.

The preferred implementation of the first stage amplifier is shown in FIG. 13 and comprises a differential charge amplifier circuit. The sensor output signal Si is provided to an OPA404-type op amp modified by a test signal St and RC circuits RfCf, R1C1 to give a first stage output O1. Other implementations might also be appropriate, such as single-ended or balanced charge or voltage amplifiers.

Figure 14:
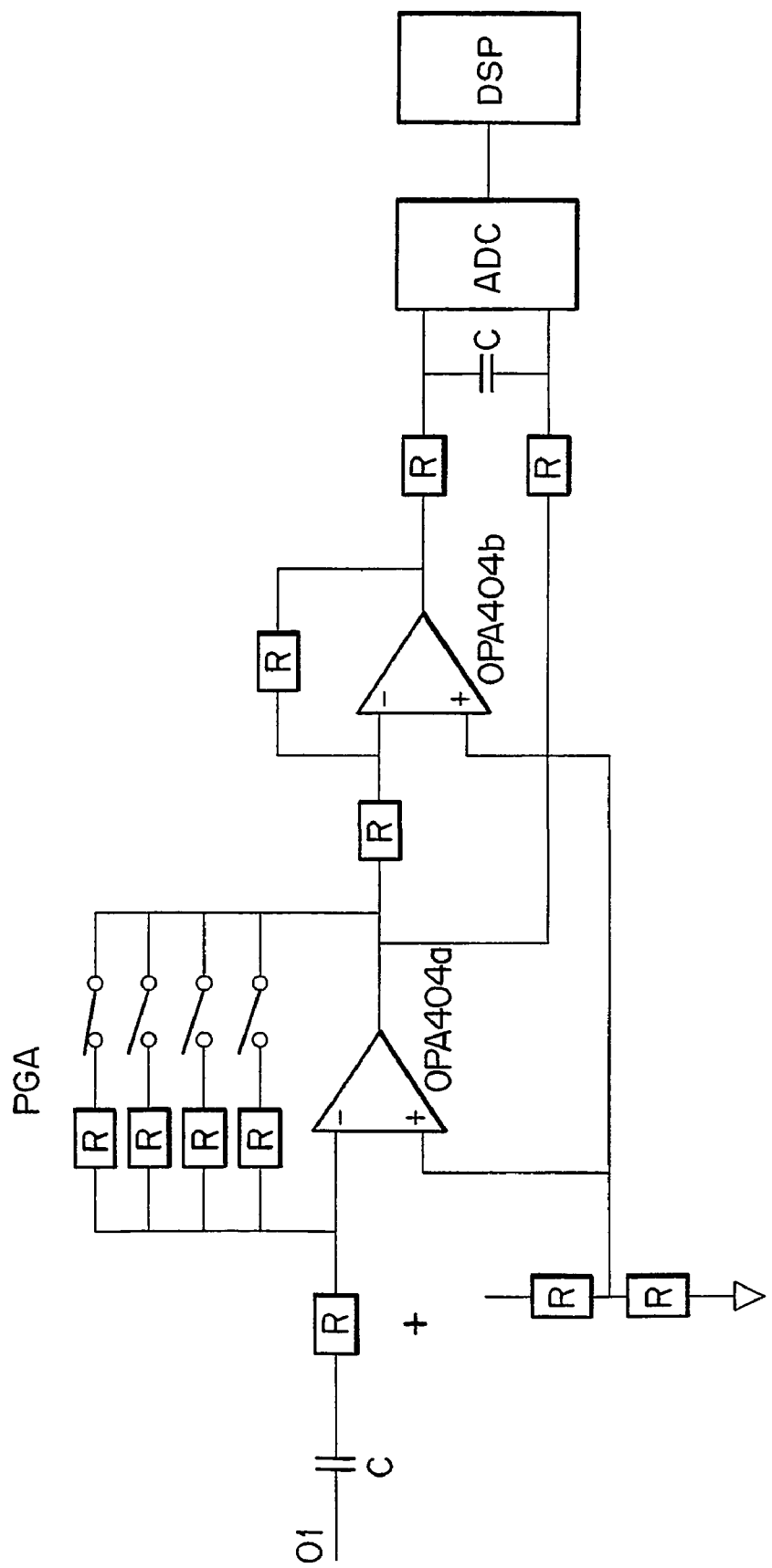
FIG. 14 shows a second stage amplifier circuit design.

The preferred implementation of the second stage amplifier is shown in FIG. 14. This takes as its input the first stage output O1 and conditions the signal using two OPA404 type op amps (OPA404a, OPA404b) and a PGA with appropriate R and C elements. Again, other circuit designs might also be appropriate. The output of the second stage passes to the ADC and then to the receiver DSP which acquires serial data from the four ADCs per station through a parallel bus and converts it to serial data. The DSP also functions to provide signal processing for signal deconvolution when coded sequences are used from the acoustic signal sources (e.g. M-sequences), to provide controls to the devices such as the ADC and PGA on the circuit boards and to communicate with the master DSP in the electronics cartridge including transmission of the acquired data.

The above description is by way of example of various embodiments of the invention. Changes can be made while still utilising the inventive concept presented here. In particular, the physical size and shape of the mandrel and block structures can be varied to suit requirements. Also, the electronic designs presented here may be replaced by others in particular circumstances. None of these changes affect the inventive concept presented here. The invention can be applied to other tools in which it is desired to generate acoustic signals and make acoustic measurements.

The invention claimed is:

1. An acoustic borehole logging tool comprising:
   at least one acoustic signal source;
   at least one acoustic receiver section; and
   a spacer, disposed between the acoustic signal source and the receiver section, comprising a substantially continuous mandrel having a series of mass blocks, each mass block having an inner surface defining a cavity, a region of the inner surface of the mass blocks being in direct contact with the outer surface of the mandrel such that the mass blocks are fixedly secured on the mandrel, the mandrel and mass blocks secured thereon being configured, and the mass blocks being positioned on the mandrel, so that the spacer is configured to behave acoustically as a mass-spring structure.

2. A logging tool as claimed in claim 1, comprising a tool body including a substantially continuous structural member extending between the acoustic signal source and the acoustic receiver section.

3. A logging tool as claimed in claim 1, comprising monopole and dipole acoustic signal sources.

4. A logging tool as claimed in claim 1, wherein the mandrel is hollow and defines a conduit for wiring between sections of the logging tool disposed on either side of the spacer.

5. A logging tool as claimed in claim 1, where no outer sleeve is provided for the series of blocks.

6. A logging tool as claimed in claim 1, wherein each block has an opening defined therein to allow cleaning of a region around the mandrel.

7. A logging tool as claimed in claim 1, wherein the receiver section includes mass blocks.

8. A logging tool as claimed in claim 7, wherein at least some of the mass blocks carry acoustic receiver elements.

9. A logging tool as claimed in claim 8, wherein receiver elements are disposed on each of a number of neighboring mass blocks so as to form a linear array.

10. A logging tool as claimed in claim 9, wherein the array is formed from at least eight adjacent mass blocks.

11. A logging tool as claimed in claim 8, wherein each mass block carrying acoustic receiver elements has a number of elements disposed around the periphery thereof.

12. A logging tool as claimed in claim 8, wherein each receiver element has associated electronic circuitry to provide a digital output therefrom, such that the output from each receiver element is converted into digital format by circuitry located adjacent to its respective receiver.

13. A logging tool as claimed in claim 12, wherein the electronics are located around the central mandrel adjacent associated receiver elements.

14. A logging tool as claimed in claim 7, wherein at least one mass block carries at least four receiver elements.

15. An acoustic borehole logging tool comprising:
   at least one acoustic signal source;
   an acoustic receiver sonde comprising a substantially continuous mandrel having a series of mass blocks, each mass block having an inner surface defining a cavity, a region of the inner surface of the mass blocks being in direct contact with the outer surface of the mandrel such that the mass blocks are fixedly secured on the mandrel, at least some of the mass blocks carrying acoustic receiver elements, the mass blocks and the mandrel being configured and the mass blocks being positioned on the mandrel to provide structural support and behave acoustically as a mass-spring structure.

16. A logging tool as claimed in claim 15, wherein receiver elements are disposed on each of a number of neighboring mass blocks so as to form a linear array.

17. A logging tool as claimed in claim 16, wherein the array is formed from at least eight adjacent mass blocks.

18. A logging tool as claimed in claim 15, wherein each mass block carrying acoustic receiver elements has a number of elements disposed around the periphery thereof.

19. A logging tool as claimed in claim 15, wherein each receiver element has associated electronic circuitry to provide a digital output therefrom, such that the output from each receiver element is converted into digital format by circuitry located adjacent to its respective receiver.

20. A logging tool as claimed in claim 19, wherein the electronics are located around the central mandrel adjacent associated receiver elements.

21. A logging tool as claimed in claim 15, wherein electronics are located around the mandrel adjacent associated receiver elements.

22. A logging tool as claimed in claim 15, wherein at least one mass block carries at least four receiver elements.

23. A logging tool as claimed in claim 15, comprising at least one receiver element mounted on at least one mass block.

24. A logging tool as claimed in claim 23, comprising a piezoelectric cylinder.

25. A logging tool as claimed in claim 23, comprising a stack of piezoelectric plates.

26. A logging tool as claimed in claim 23, wherein one or more mass block carrying at least one receiver element has a plurality of elements around the periphery thereof.

27. A logging tool as claimed in claim 26, wherein a mass block carries at least four receiver elements.

28. A logging tool as claimed in claim 23, wherein a number of acoustic receiver elements are carried on multiple mass blocks so as to form an array.

29. A logging tool as claimed in claim 15, comprising electronics disposed on one or more mass blocks.

30. A logging tool as claimed in claim 29, wherein the electronics includes receiver front end electronics.

31. A logging tool as claimed in claim 30, wherein the electronics are located adjacent associated receiver elements.

32. An acoustic borehole logging tool comprising:
   at least one acoustic signal source;
   a receiver section; and
   a spacer section disposed between the acoustic signal source and the receiver section; wherein the receiver section and the spacer section each comprise a substantially continuous mandrel having a series of mass blocks, each mass block having an inner surface defining a cavity, a region of the inner surface of the mass blocks being in direct contact with the outer surface of the mandrel such that the mass blocks are fixedly secured on the mandrel, the mandrel and mass blocks secured thereon being configured and the mass blocks being positioned on the mandrel to provide structural support and behave acoustically as a mass-spring structure.

33. A logging tool as claimed in claim 32, wherein receiver elements are disposed on a number of neighboring mass blocks so as to form a linear array and each receiver element has associated electronic circuitry to provide a digital output therefrom, such that the output from each receiver element is converted into digital format by circuitry located adjacent to its respective receiver.

* * * * *